United States Patent
Belykh et al.

(10) Patent No.: US 7,218,763 B2
(45) Date of Patent: May 15, 2007

(54) METHOD FOR AUTOMATED WINDOW-LEVEL SETTINGS FOR MAGNETIC RESONANCE IMAGES

(75) Inventors: Igor Belykh, Palo Alto, CA (US); Craig W. Cornelius, Menlo Park, CA (US)

(73) Assignee: Eastman Kodak Company, Rochester, NY (US)

( * ) Notice: Subject to any disclaimer, the term of this patent is extended or adjusted under 35 U.S.C. 154(b) by 694 days.

(21) Appl. No.: 10/375,408

(22) Filed: Feb. 27, 2003

(65) Prior Publication Data

US 2004/0170308 A1 Sep. 2, 2004

(51) Int. Cl.
G06K 9/00 (2006.01)
(52) U.S. Cl. ..................... 382/128; 382/260
(58) Field of Classification Search ........ 382/128–132, 382/260; 600/410–432, 458, 921
See application file for complete search history.

(56) References Cited

U.S. PATENT DOCUMENTS

| | | | |
|---|---|---|---|
| 4,352,105 A * | 9/1982 | Harney | 250/338.1 |
| 5,042,077 A | 8/1991 | Burke | |
| 5,261,050 A | 11/1993 | Fox et al. | |
| 5,268,967 A | 12/1993 | Jang et al. | |
| 5,305,204 A * | 4/1994 | Ohhashi | 382/131 |
| 5,357,549 A * | 10/1994 | Maack et al. | 378/62 |
| 5,467,404 A * | 11/1995 | Vuylsteke et al. | 382/274 |
| 5,734,739 A * | 3/1998 | Sheehan et al. | 382/128 |
| 5,835,618 A | 11/1998 | Fang et al. | |
| 5,900,732 A * | 5/1999 | Felmlee et al. | 324/309 |
| 5,995,644 A | 11/1999 | Lai et al. | |
| 6,175,643 B1 | 1/2001 | Lai et al. | |
| 2002/0016718 A1* | 2/2002 | Rothschild et al. | 705/2 |
| 2002/0057827 A1* | 5/2002 | Nagata et al. | 382/131 |
| 2003/0095695 A1* | 5/2003 | Arnold | 382/131 |

* cited by examiner

Primary Examiner—Matthew C. Bella
Assistant Examiner—Patrick Edwards

(57) ABSTRACT

A method of automatically determining window-level settings in a digital image of a subject. The method includes the steps of: accessing the digital image; obtaining body part or coil type information; determining a region of interest (ROI) within the digital image; producing and processing a ROI-histogram; defining a W-L value for a linear or non-linear image intensity range re-mapping; and a linear or non-linear re-mapping the image intensity range.

18 Claims, 14 Drawing Sheets

 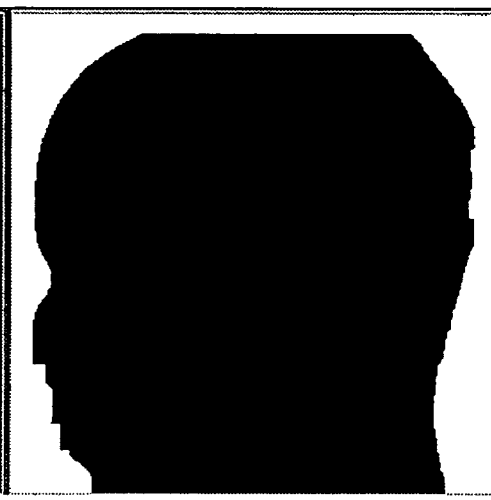
FIG. 12a         FIG. 12b
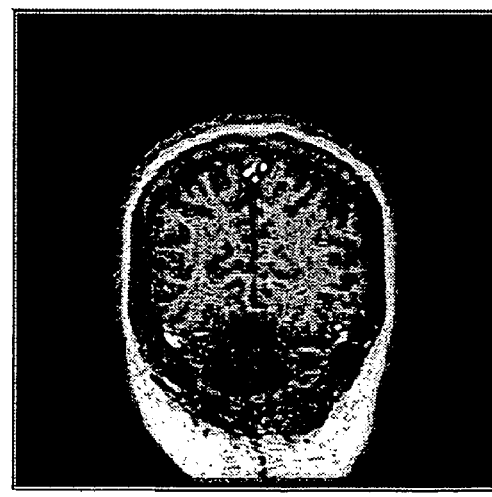 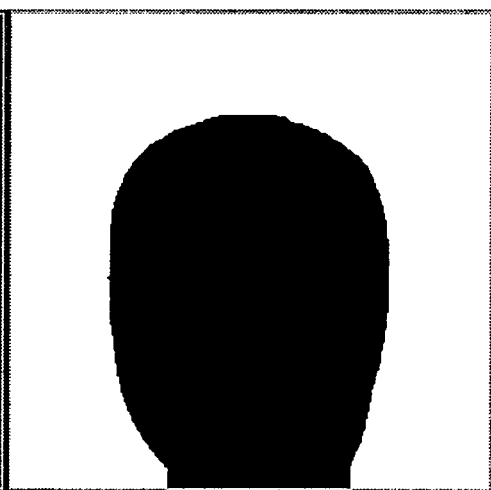
FIG. 13a         FIG. 13b

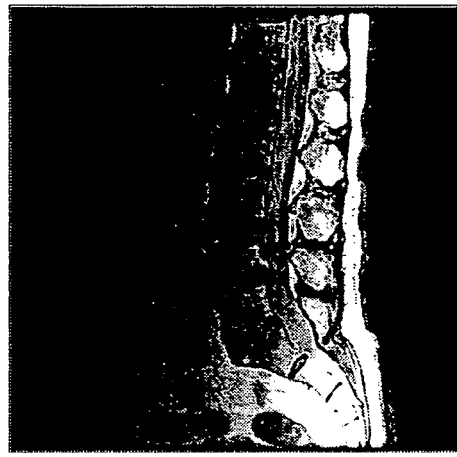 
FIG. 15a      FIG. 15b
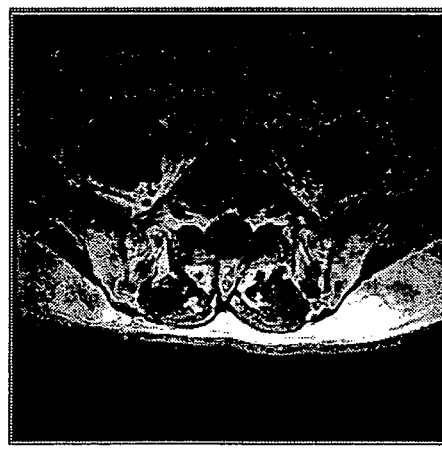 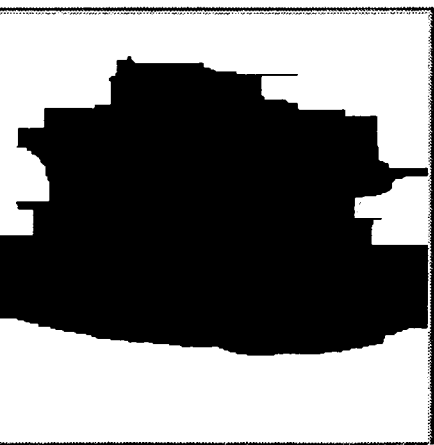
FIG. 16a      FIG. 16b

METHOD FOR AUTOMATED WINDOW-LEVEL SETTINGS FOR MAGNETIC RESONANCE IMAGES

FIELD OF THE INVENTION

The invention relates generally to the field of medical imaging, and in particular to digital image processing and display in Magnetic Resonance Imaging. More specifically, the invention relates to improved image representation for diagnostic purposes.

BACKGROUND OF THE INVENTION

Magnetic Resonance (MR) images are acquired during medical examinations on Magnetic Resonance Imaging (MRI) apparatus and stored in digital form in image archives. The digital data of the MR image can be stored and transferred to other image display, analysis, and archiving systems by means of a computer network. The digital data is typically transmitted over a communication network using a DICOM Standard (Digital Imaging and Communications in Medicine (DICOM), Part 3: Information Object Definitions, PS 3.3-2001).

The acquired pixel values in an MR image do not relate directly to the brightness and contrast of display for diagnostic use of the image, and frequently no information is provided about ideal window width (contrast) and window level (brightness) that should be applied to the image for this purpose. If the window width and level are present, very often this information is not optimal for diagnostic use. Therefore radiologists or technicians usually need to manually adjust window width and window level of these MR images (often referenced as window-level (W-L)) before the diagnosis can be performed on a display workstation. The manual adjustment procedures require the user's time and energy, particularly if a large number of MR slices are acquired for the patient. Even a single study may include hundreds or thousands of individual images, grouped into several series for different spatial views and/or acquisition parameters. Since the characteristics of the images in a given series are similar, some medical personnel in order to be efficient usually adjust W-L not for each slice individually but only for the most clinically important one in each series (often this is a slice in the middle of the acquired volume, or close to it). However, when W-L values are set to the same value for all images in the same series, the results may not be optimal for all the images and may require additional adjustment for diagnostic use.

Another consideration is that the range of gray scale used in conventional workstation monitors (typically, 8 bits) is oriented to the sensitivity of the human eye to small differences in light levels. However, the original image often has 1024 to 4096 or more gray levels (i.e., 10–12 or more bits). Therefore, a manual adjustment must be made without loosing diagnostically valuable features of the MR image. This is typically not a trivial task, particularly if there is more than one area of diagnostic interest within the image, and also when those areas significantly differ in intensity dynamic range. For these reasons, radiologists and MR technicians often differ in their subjective opinions about the W-L setting for the presentation of an image with best image quality. For MRI, there is no unanimous agreement on the best presentation of this data, so a universal solution of the problem of picking W-L values does not exist. This is often referred to as the "Window-Level problem" or "W-L problem".

Another consideration of the W-L problem are the characteristics of MR images. For example: (1) MR images are measurements of very low energy quantum processes. As such, the images are often noisy, with maximal and minimal pixel intensity values that vary from image to image, and also within a particular image, e.g. spikes and background noise. (2) There are different types of possible MRI acquisitions, for example, T1 or T2 weighted series. Each type of acquisition may require different parameters for optimal image display. (3) Image acquisition may be done with either (i) transmitting/receiving coils that surround the part of the patient being imaged (for example, head, extremity, or whole body) or (ii) surface coils for structures such as the neck and spine. (4) The size and mass distribution of individual patients can affect the values obtained from an MRI acquisition in complex ways. (5) Different users may prefer different "looks" of images with regard to image brightness and contrast. (6) The display monitor type (e.g., regular, flat panel), age (e.g., old, new), settings (e.g., gamma curve, etc.) have an effect on how an image area is displayed on a monitor.

One method to automatically set W-L values is to determine the maximal and the minimal intensity values of each MR image, and then to map the values to an output range [0, 255] in a linear fashion. This method, which is readily calculatable, does not work well for many MR images, in particular, for those acquired with surface coils.

There have been prior art efforts to automate the manual adjustment procedures to address the Window-Level problem for different medical modalities, (e.g. X-ray, CT, MRI). Those efforts may be classified into three groups. The first group comprises methods wherein the operator participates in image quality evaluation to find the W-L values. The second group comprises semi-automatic methods wherein the operator provides some input or are based on values that have been determined empirically from operator experience. The third group includes adaptive and automatic methods.

With regard to the first group, one known approach is sometimes referred to as "static contrast windowing". This approach places the midpoint of the 8-bit dynamic range at the average intensity value of the region of interest (ROI) in the image, which is usually defined with operator assistance. The intensity values that are below the contrast window are presented as black on the display and values above the contrast window are displayed as white. Intensity values within the contrast window are mapped to corresponding display brightness values using a straight-line transfer curve. Contrast windowing is "static" when the window and the transfer curve are fixed for the conversion of the entire image data array. Details within the intensity range of the contrast window are shown on the display using the 8 bits of dynamic range. The remaining portion of the image, however, are displayed as either "too white" or "too black", with no details perceivable in the presentation. When other areas of interest are not represented properly at the selected W-L setting, more than one presentation of the image may be needed, each with a different contrast window to properly represent important anatomical details at all brightness levels.

Another approach sometimes used in X-ray CT practice employs a transfer curve having two contrast windows applied to a single image. This dual window approach uses two grayscale ramps or "windows" in a single display, where one window is set to encompass the brightness levels around bone and the other window is set to cover the brightness levels around soft tissue. With this approach, the anatomy shown in CT images is generally known to the user. As such, a trained user knows a priori what region of an image is soft tissue and what is bone, so that the simultaneous display of two gray ramps in the same image is not confusing to the user. However, in any anatomic regions which are intermediate in brightness between the windowed soft tissue and bone, the X-ray CT image values may be displayed using parts of both grayscale ramps, which can be very confusing. This limits the applicability of dual ramp presentation of CT. A common method of displaying such images uses separate presentations of the same image using the full bone range applied to the image in one display area, and the soft tissue range is applied to another image in a separate display area. However, neither a dual-ramp presentation or multiple presentations with fixed W-L settings may be acceptable for MRI, since the digital values of images are not calibrated to be independent of the individual examination as they are in CT. As discussed above, the proper Window-Level for any particular image depends on a variety of factors that vary from image to image, from series to series, and from patient to patient.

One technique intended to enable the operator to select a static window is described in U.S. Pat. No. 5,042,077 (Burke). The medical imaging equipment produces an image of the subject under study and presents a graph of the image's histogram, which indicates the distribution of brightness levels of the image pixels. Using a trackball, the operator manipulates a contrast window which is displayed on the histogram and which enables the operator to select brightness ranges in the image for contrast enhancement.

With regard to the second group (i.e., the semi-automatic algorithms), U.S. Pat. No. 5,900,732 (Felmlee) relates to an automatic windowing method for MR images. The method includes producing a histogram of the reconstructed image; removing histogram bins with less than a threshold (T) number of pixels; calculating a window level by determining the mean intensity of the remaining histogram bins; and calculating the window width WW according to a fixed relationship. While this method may have achieved a certain degree of success in its particular application, the method requires a manual step of setting the threshold T, and therefore, requires the involvement of an MRI technician or radiologist in the task of setting the W-L.

U.S. Pat. No. 5,835,618 (Fang) relates to a method for dynamic range re-mapping for optimum image display. This method employs a user-defined parameter for both additive and multiplicative algorithms, as well as a "mixing" algorithm for the dynamic range re-mapping, thus requiring an involvement of medical personnel into the technical details of adjusting W-L.

U.S. Pat. No. 5,357,549 (Maack) relates to a method of dynamic range compression of an x-ray image wherein a non-linear mapping function is employed to determine the equalization value for each pixel in the image. This method's final output is dependent on a lowpass filtered signal from the local neighborhood around each pixel. A disadvantage of this method is the limitation of being able to display only one range of image data that is of primary interest with the best gray scale presentation; a disadvantage particularly if more than one range needs to be displayed simultaneously.

One non-linear method for image intensity correction in MRI is described in Handbook of Medical Imaging, 2000. This method is based on intensity non-uniformity (INU) field estimation using the log-transformed image histogram as a probability density function (PDF) approximation. This field is iteratively smoothed with a B-spline function and is used for intensity correction by means of mapping the original histogram to the one sharpened by deconvolving a Gaussian blurring kernel.

With regard to the third group (i.e., adaptive or automatic algorithms), one known method for mapping data brightness levels to a display having a limited dynamic range is known in the art as adaptive contrast enhancement. One variant is "adaptive histogram equalization" (AHE). Unlike methods which are "static", the AHE method does not employ a fixed contrast window for the entire image. Instead, the AHE method looks at each datum intensity value in the acquired data array one at a time and compares it with the values in a local surrounding spatial area, or "context region". The length and width of the context region may, for example, range from one sixth to one sixtieth of the length and width of the entire image data array. While there are many variations on the calculations employed with this method, generally the centered datum value is mapped to a display brightness, which provides contrast with respect to the other data values that are generally within the same context region. The calculations are performed, in principle, at each pixel location in the image data array with respect to its surrounding context region and the method is, therefore, computationally intensive. The AHE method and some variations are described in "Algorithms For Adaptive Histogram Equalization", Pizer, S. M., Austin, J. D. et al., SPIE Vol. 671, Physics and Engineering of Computer Multidimensional Imaging and Processing, 1986.

U.S. Pat. No. 5,305,204 (Ohhashi) relates to a digital image display apparatus with automatic window level and window width adjustment. With this apparatus, a pixel value of a digital image data is converted into brightness by using a suitable conversion function, and displaying an image within an optimum window. This pure neural network based method may not be reliable or accurate when encountering a new kind of input image which has not been seen in the training set of the neural network.

Another method which employs a neural networks for automatic window-level adjustment in MRI is disclosed in U.S. Pat. No. 5,995,644 (Lai). A further method which employs a neural networks is disclosed in U.S. Pat. No. 6,175,643 (Lai).

U.S. Pat. No. 5,268,967 (Jang) relates to a method for automatic foreground and background detection in digital radiographic images. The method includes the step of detecting edges in the image signal based on a morphological edge detector.

Accordingly, while the apparatus and methods described above may have achieved certain degrees of success in their particular applications, the manual methods in W-L adjustment can lead to variations in image quality because individual operators have different opinions regarding a preferred presentation of specific MRI images data. In addition, the manual adjustment requires time, therefore reducing throughput of the medical imaging system for diagnosis. The semi-automated methods employ manual selection of parameters or require the operator to evaluate one or more criteria of an image or study. Prior art adaptive methods may also need some operator participation or at least some prior information to train the system, which produces final W-L parameters for display.

As such, there exists a need for an apparatus and method which overcomes the problems described above. The present invention is directed to overcoming the problems described above. In particular, the present invention is directed to a fully automated method. The method is based on modeling radiologist's criteria for the appearance of MR images and comprises of a sequence of steps in W-L adjustment. This method performs both spatial image and histogram analysis and processing, and can include the steps of obtaining of the body part or coil type information, extraction of the region of interest (ROI) within the original digital image, a W-L definition based on pixel value distribution analysis within extracted ROI, and linear or non-linear re-mapping of the original image range of intensities to the gray scale range of the display.

SUMMARY OF THE INVENTION

An object of the present invention is to provide a fully automated method for window-level setting for MR images.

Another object of the present invention is to provide such a fully automated method which requires no or minimal adaptation or training for the method itself or for the users.

A further object of the present invention is to provide such a fully automated method, which provides good image quality.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The method of the present invention analyzes a comprehensive set of image characteristics collected in spatial, spectral and histogram domains and header information. In addition, the method of the present invention includes two selectable options (linear or non-linear) to present images depending on the radiologist's personal perception and diagnosis needs. The non-linear window-level method of the present invention provides different image areas within ROI that might be clinically valuable to be displayed at a time, which might be impossible using only the linear method. The method is fully automated and does not need any adaptation or training for the method itself or for the users.

According to one aspect of the invention, there is provided a method of automatically determining window-level settings in a digital image of a subject. The method comprises the steps of: accessing the digital image; obtaining body part or coil type information; determining a region of interest (ROI) within the digital image; producing and processing a ROI-histogram; defining a W-L value for a linear or non-linear image intensity range re-mapping; and a linear or non-linear re-mapping the image intensity range.

BRIEF DESCRIPTION OF THE DRAWINGS

The foregoing and other objects, features, and advantages of the invention will be apparent from the following more particular description of the preferred embodiments of the invention, as illustrated in the accompanying drawings.

in FIG. 3b for head coronal view (surrounding coil), in FIG. 3c for spine sagittal view (surface coil); and in FIG. 3d for spine axial view (surface coil).

in FIG. 7b the smoothed ROI-histogram (original histogram is shown in dotted line); in FIG. 7c the smoothed ROI-histogram thresholded for non-linear intensity re-mapping method (threshold for linear method is shown in dotted line); and in FIG. 7d the re-mapping transfer functions.

in FIG. 8b the smoothed ROI-histogram (original histogram is shown in dotted line); in FIG. 8c the smoothed ROI-histogram thresholded for non-linear intensity re-mapping method (threshold for linear method is shown in dotted line); and in FIG. 8d the re-mapping transfer functions.

in FIG. 9b the smoothed ROI-histogram (original histogram is shown in dotted line); in FIG. 9c the smoothed ROI-histogram thresholded for non-linear intensity re-mapping method (threshold for linear method is shown in dotted line); and in FIG. 9d the re-mapping transfer functions.

in FIG. 10b the smoothed ROI-histogram (original histogram is shown in dotted line); in FIG. 10c the smoothed ROI-histogram thresholded for non-linear intensity re-mapping method (threshold for linear method is shown in dotted line); and in FIG. 10d the re-mapping transfer functions.

in FIG. 11b the smoothed ROI-histogram (original histogram is shown in dotted line); in FIG. 11c the smoothed ROI-histogram thresholded for non-linear intensity re-mapping method (threshold for linear method is shown in dotted line); and in FIG. 11d the re-mapping transfer functions.

FIGS. 12a–12b illustrate an output MR sagittal head image with non-linear re-mapped intensities (FIG. 12a) and corresponding ROI binary mask (FIG. 12b).

FIGS. 13a–13b illustrate an output MR coronal head image with non-linear re-mapped intensities (FIG. 13a) and corresponding ROI binary mask (FIG. 13b).

FIGS. 15a–15b illustrate an output MR sagittal spine image with non-linear re-mapped intensities (FIG. 15a) and corresponding ROI binary mask (FIG. 15b).

FIGS. 16a–16b illustrate an output MR axial spine image with non-linear re-mapped intensities (FIG. 16a) and corresponding ROI binary mask (FIG. 16b).

DETAILED DESCRIPTION OF THE INVENTION

Figure 1:
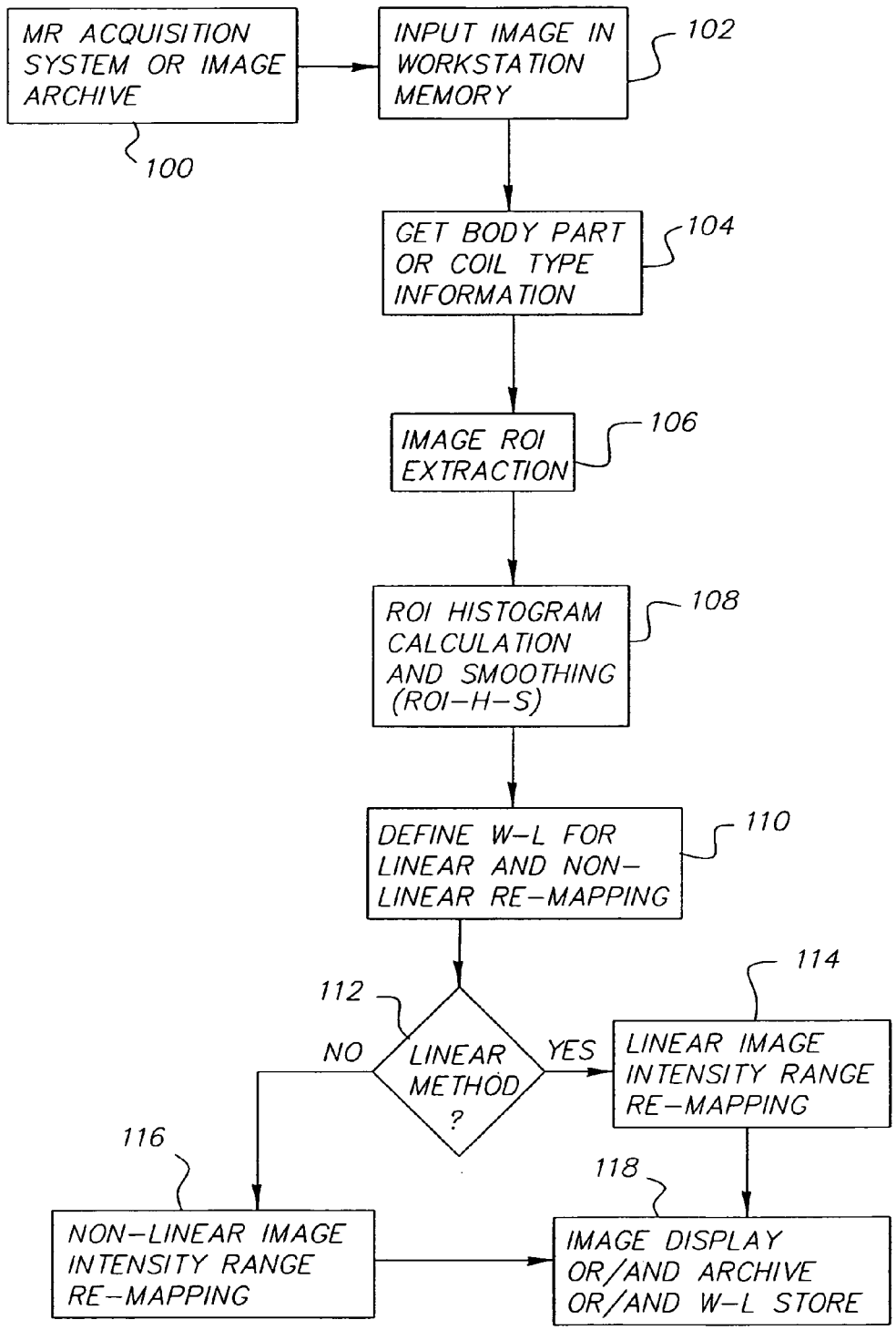
FIG. 1 shows a block diagram illustrating a process flow in accordance with the present invention for MR image input, processing, and display or archive, including an automatic window-level method.

The following is a detailed description of the preferred embodiments of the invention, reference being made to the drawings in which the same reference numerals identify the same elements of structure in each of the several figures.

The present invention recognizes that the spatial intensity distribution of an image plays an important role in the adjustment of the display window parameters, and different organs may have similar histograms but might be windowed differently. The present invention also recognizes the need to focus on the analysis of radiologist/operator actions while adjusting W-L.

The present invention provides a method for automatic calculation of the window width and window level values and intensity range re-mapping for MR images for display and/or archive. The algorithm includes five steps: body part or coil type information extraction, ROI extraction, processing of histogram calculated within the ROI, window-level values definition, and linear or non-linear original intensity re-mapping for image display. Body part information might be obtained from image header or might be estimated by coil type detection from the image itself, if header information is not available. ROI extraction comprises thresholding of image pixel values, then grouping the discriminated values by means of their external bounding followed by morphological filtering of the ROI boundary. ROI-histogram is calculated within the extracted ROI and the histogram is then smoothed. Window width and level are defined by means of body part/coil type dependent thresholding and adjusting of the processed ROI-histogram for further both linear and non-linear image intensity re-mapping methods. Linear re-mapping is well known standard method and is done by simple projection of image pixel values within the defined window to a display gray scale range. Non-linear re-mapping presumes that image pixels are transformed using a non-linear weighting function. In both re-mapping methods, the image pixel values that are less/greater than window width lower/upper limit are set to black/white respectively. The non-linear method can be used as an alternative user selectable option and can be useful when multiple areas with different dynamic ranges within the ROI are needed to be displayed, especially for images with a very broad original range (e.g., more than 12 bits).

Applicants have recognized two goals of a radiologist/technician in adjusting image brightness and contrast: first, within clinically important areas to reach the right balance between the amount of dark and bright spots (using those limits as landmarks), and second, to display the rest of the chosen area with maximum contrast within available gray scale. The clinically important area is often a global ROI (i.e., the whole body part), but sometimes it might be a sub-region of the image (i.e., a specific area within a body part). In the latter case, particularly when different local areas have different intensity ranges, it might be necessary to produce several images with different W-L values or to find a compromise setting to display them together, depending on body part.

The present invention employs several steps of image analysis and processing: body part or coil type information obtaining, global ROI extraction, intensity distribution analysis within ROI, W-L values calculation, image intensity range re-mapping and image display/archive.

Referring to FIG. 1, there is shown a block diagram illustrating a process flow in accordance with the present invention for MR image input, processing, and display or archive, including an automatic window-level method. More particularly, a MR digital image is acquired (block 100) and the MR image is transmitted to a workstation memory (block 102). At block 104, a body part or coil type information is obtained. Then, the image ROI is extracted (block 106). A histogram within the ROI is then calculated and smoothed (block 108). Window-level values are defined for both the linear and non-linear methods (block 110). If a linear method is determined (block 112), then a linear image intensity range re-mapping occurs (block 114). If a non-linear method is determined, then a non-linear image intensity range re-mapping occurs (block 116). The linear method might be used as a default while the non-linear method may be preferable in case of multiple local ROI or when a very broad original range of intensities exists in the image. Finally, the image can be displayed or/and archived, or the calculated W-L values may be stored in the image header for transmission to other storage or display systems (block 118).

With regard to blocks 100 and 102, the acquisition of an MR digital image and its transmission to a workstation memory are well known to those skilled in the art.

Block 104 comprises the extraction of body part or coil type information. It is noted that this information may or may not be explicit in the additional data that describes the image. That is, although DICOM includes tags that can describe the body region and acquisition conditions, some of these tags are optional, may be empty, or may be filled inconsistently. For example, DICOM Tags Receiving Coil (0018,1250) & Transmitting Coil (0018,1251) are both DICOM Type 3, and as such, they are completely optional, or if present may be empty. In addition, there are no defined terms for these values, so it is not possible to use them to determine consistently good information on the acquisition details. But if the information in those tags is available then it can be used for input parameters (i.e., body part and view).

Applicants have noted that, with many MRI studies, images of the cervical, thoracic, and lumbar spine regions require a different W-L calculation than images from other parts of the body, including the head, chest, abdomen, and extremities. Applicants believe that a difference is that spine images are acquired using a surface coil whereas other body regions are taken with coils that surround the body region, such as a head coil.

Images taken using surrounding coils provide consistent brightness for a given tissue throughout the image area. For example, the average brightness of similar brain tissue is consistent over an image acquired with a head coil. An analysis of the histogram of such an image is simplified by the uniformity of values in the image for the same tissue through the image region.

An effect of a surface coil is that the anatomy close to the body surface is relatively bright, and parts of the image farther from the coil are dark. The brightness of a tissue depends not only on the characteristics of that tissue but also on the distance relative to the coil. This results in bright regions in the image generally found in a region under the skin and parallel to the anatomy of interest. Therefore the presentation of such an image to show the tissues of interest depends on knowledge of how the coil is positioned relative to the body region to be examined.

Other specialized coils may be employed for some kinds of imaging, including breast imaging and also MRI of the jaw for temporal-mandibular joint (TMJ) evaluations. These also produce localized regions in the images that are especially bright near the coil positions.

The present invention employs an algorithmic method that determines if it is likely that the MR image was acquired using a surface coil or with a surrounding coil. This method is based on image symmetry analysis. These data are then used as input to the analysis method that determines the actual W-L values for the image if there was no information in the image header. In addition, it is generally the case that all images in single series of an MRI examination are acquired with the same physical configuration. Thus, even if the determination of surfaces vs. surrounding coil is not accurate for each individual image, applying the algorithm to each image in the series will provide a strong indication of the type of coil used for the entire series.

If a symmetrical image is considered as a set of random variables obtained by sampling a stationary stochastic process (MRI signal acquisition), then its statistical properties should not depend greatly on the direction of sampling the image's values. To verify this, an estimation can be made of the variation of local mean values, calculated for each image profile individually, from global one (for the whole image) depending on direction. The algorithm for coil detection is dependent on this characteristic.

Figure 2:
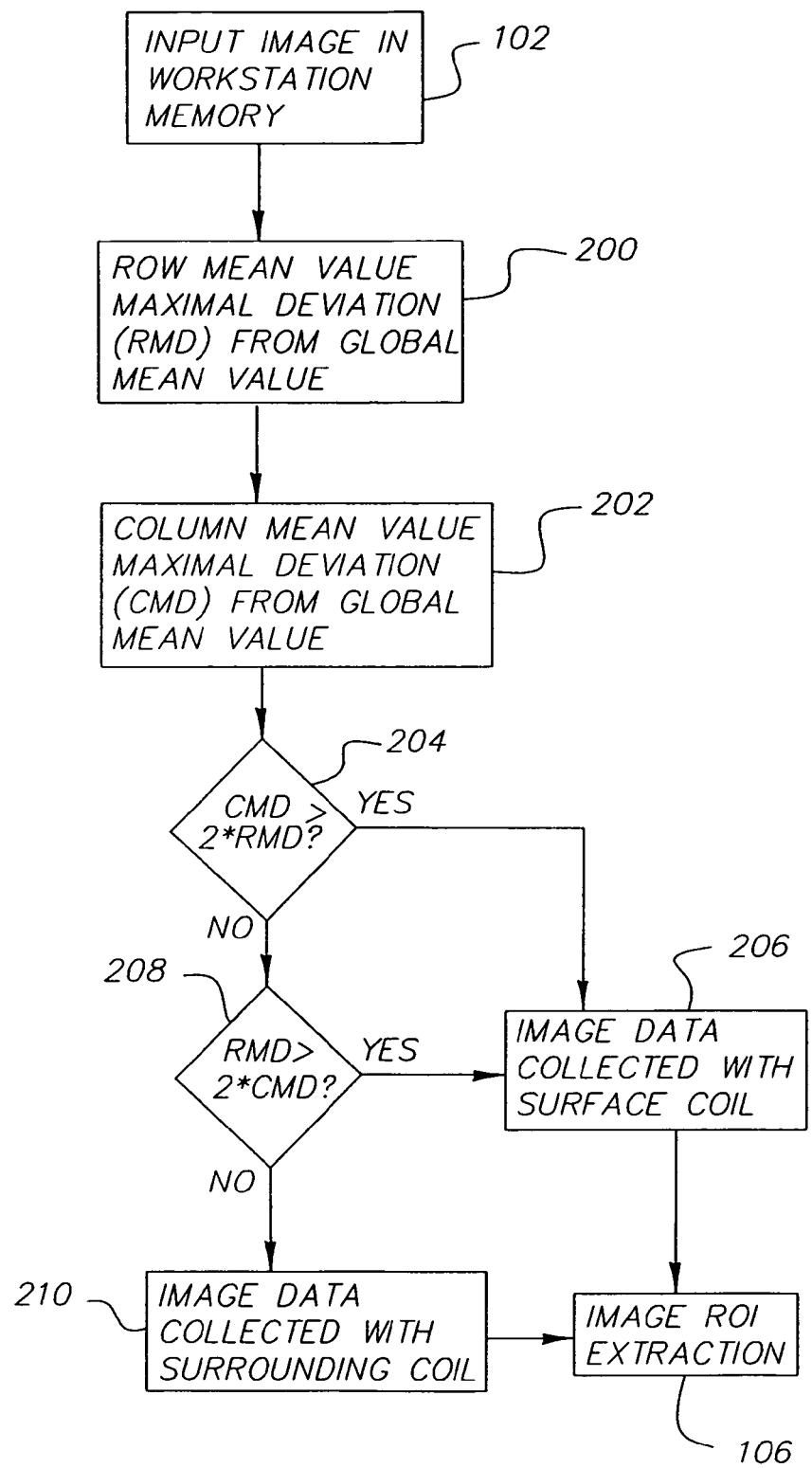
FIG. 2 shows a block diagram illustrating an algorithm in accordance with the present invention for determining a coil type used in acquiring an MR image.

Referring now to FIGS. 2, for a particular MR image, the coil detection algorithm of block 104 is now discussed. More particularly, block 104 is comprised of the steps disclosed by blocks 200–210.

With the input image in the workstation memory (block 102), for each row of the image, a mean value is computed to obtain a vector of row mean values and then find that row vector maximal deviation (RMD) from an image global mean value (GMV) (block 200). Then, at block 202, for each column of the image, a mean value is computed to obtain a vector of column mean values and then find that column vector maximal deviation (CMD) from the GMV.

If the CMD is greater than a predetermined value (block 204), then the data is determined to a surface coil image (block 206), and the image ROI extraction is accomplished (block 106). This predetermined value is preferably an empirically determined constant times the RMD, more particularly, 2 times RMD.

If the RMD is greater than a predetermined value (block 208), then the data is determined to a surface coil image (block 206), and the image ROI extraction is accomplished (block 106). This predetermined value is preferably an empirically determined constant times the CMD, more particularly, 2 times CMD.

If neither the CMD nor the RMD is greater than the predetermined value (i.e., blocks 204 and 208 are not met), then the data is interpreted as an image acquired with a surrounding coil (block 210).

It is noted that the empirically determined constant of about 2 for image asymmetry factor in blocks 204 and 208 has been found to give acceptable results.

Accordingly, the output of the step of block 104 is either (i) body part (and/or view) obtained from the MR image header or (ii) coil type information extracted from image analysis. In a case of a correlation of both outputs, the header information is preferable, however in case of a conflict, the coil type information has higher priority. For example, if the image header information was incorrectly completed.

Figure 3A:
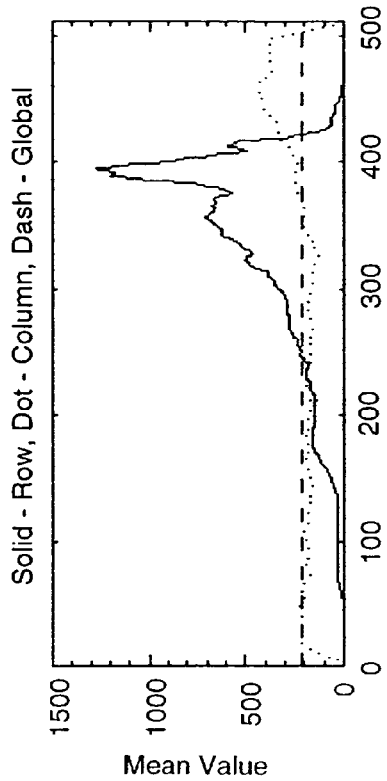
FIGS. 3a–3d illustrate an image row and column mean value vectors relationship in FIG. 3a for head sagittal view (surrounding coil)
Figure 3B:
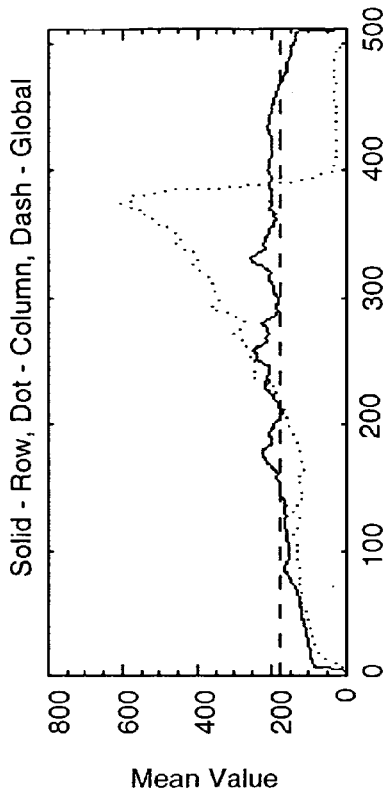
Figure 3C:
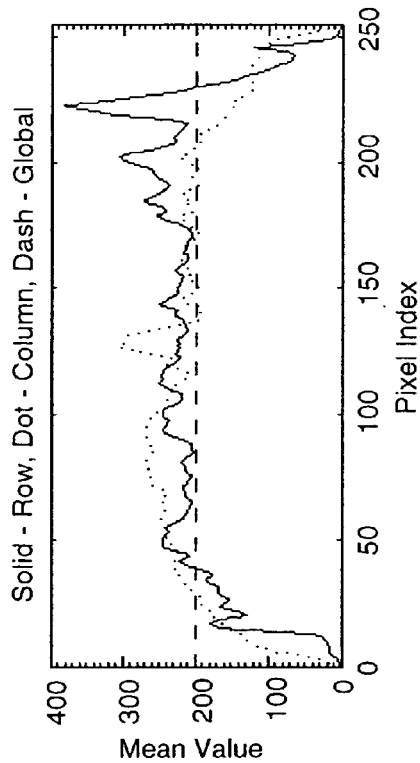
Figure 3D:
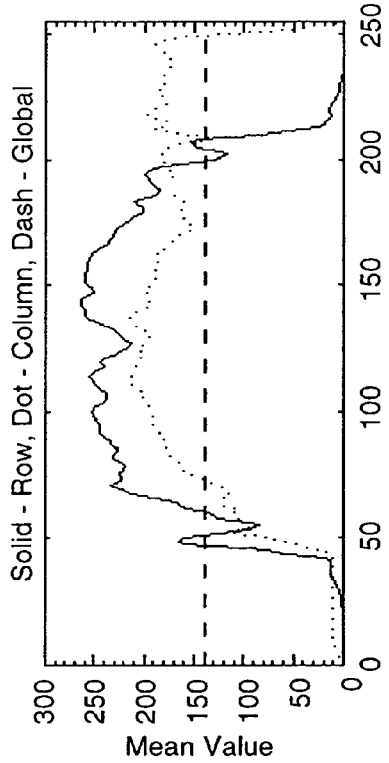

FIGS. 3a–3d illustrate an image row and column mean value vectors relationship, i.e. those vectors deviation from GMV. FIG. 3a illustrates a head sagittal view (surrounding coil). FIG. 3b illustrates a head coronal view (surrounding coil). FIG. 3c illustrates a spine sagittal view (surface coil). FIG. 3d illustrates a spine axial view (surface coil). The deviations of mean value vectors from GMV for head images do not differ much, illustrating image symmetry, while large difference in mean value vector deviations for spine images indicates image asymmetry.

The next step in the method of the present invention is global ROI extraction. Accordingly, referring now to FIG. 4, the image ROI extraction block 106 is now discussed. More particularly, block 106 is comprised of the steps disclosed by blocks 302–310.

As previously considered, image profiles are random variables. Since an image profile is a 1-D spatial distribution of intensities (unsigned function), its frequency spectrum has a peak at a frequency equal to DC. The 2-D frequency spectrum of such image will also have a peak at DC, which indicates a presence of constant shift of all image values.

It is known from statistics (refer to Fuller W. A. "Introduction to Statistical Time Series", Wiley, John & Sons, 1995.) and signal processing (refer to Wahl F. M. "Digital image signal processing", Artech, 1987.) theory that subtracting the random variable mathematical expectation (mean value) from all its values will remove such shift. This technique is acceptable for signed functions (signals) to improve the signal-to-noise ratio (SNR) or to calculate other statistical characteristics. However, this technique cannot be used the same way for unsigned (image intensity) values/functions. Moreover, image pixel values less than the mentioned above mean value correspond to image background and very low intensity values that might be of some interest, or, that is, they correspond to image histogram bins of very low or zero intensity values. If those bins have very high values, they can make the image histogram less informative (as will be shown below with reference to FIGS. 7a and 11a) and sometimes even useless for further analysis or processing (as will be shown below with reference to FIGS. 8a, 9a, and 10a).

Some prior art methods described above that remove very low intensity values in the image histogram seem to be arbitrary and not based on the expected characteristics of MRI data in spatial or frequency domain. At block 104, the body part or coil type information is obtained, and then an image GMV is determined (block 302). More particularly, in the present invention, instead of mean value subtraction, the GMV is employed as a threshold in the spatial domain to differentiate pixel values greater than it from all other pixels (block 304) for further ROI extraction and its histogram analysis. In another words, using such thresholding (segmentation) techniques for ROI extraction in space domain, the SNR is improved for the informative part of image histogram, thereby eliminating DC shift in the image spectrum. This image segmentation is performed in binary form, i.e. pixels above the threshold are set to black and background pixels are set to white to obtain an initial binary mask. The extracted black areas/pixels correspond to low-medium, medium and high intensities and are presumed to be the areas of clinical interest that would be expected from the characteristics of typical MRI modality signal-to-noise ratio. Those areas or pixels of interest (POI) are grouped by means of their external bounding (like convex shell) (block 306). The area inside the external boundary (EB) is set to black followed by standard (see Gonzales R. C., Woods R. E. "Digital Image Processing", Addison Wesley Longman, 2001.) morphological filtering (MF) to exclude spikes and the influence of background noise and also to include some areas that are possibly spatially separated from the main area of the segmented image (block 308), i.e., the islands are joined to the mainland after flooding. A global ROI is then obtained as a binary mask, (as will be shown below with reference to FIGS. 11b, 12b, 13b, 14b, 15b, and 16b) formed by pixels of interest external boundary morphologically filtered (POI EB MF, block 310).

Figure 4:
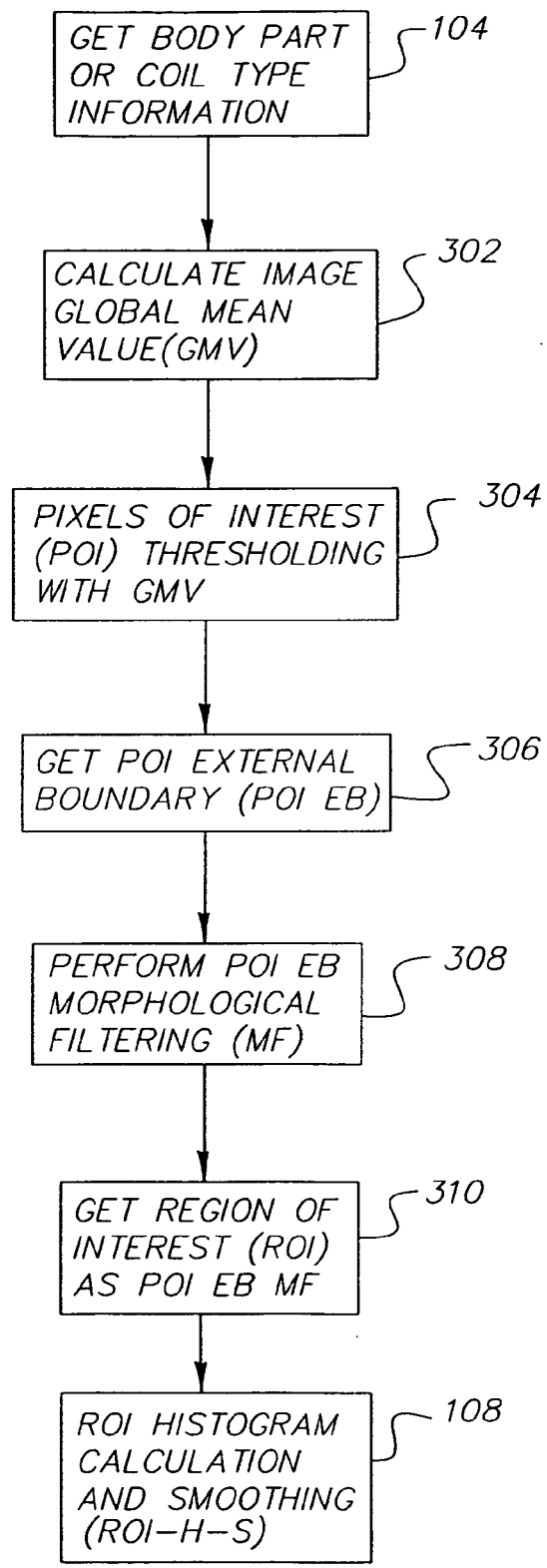
FIG. 4 shows a block diagram illustrating an image ROI extraction algorithm in accordance with the present invention.
Figure 5:
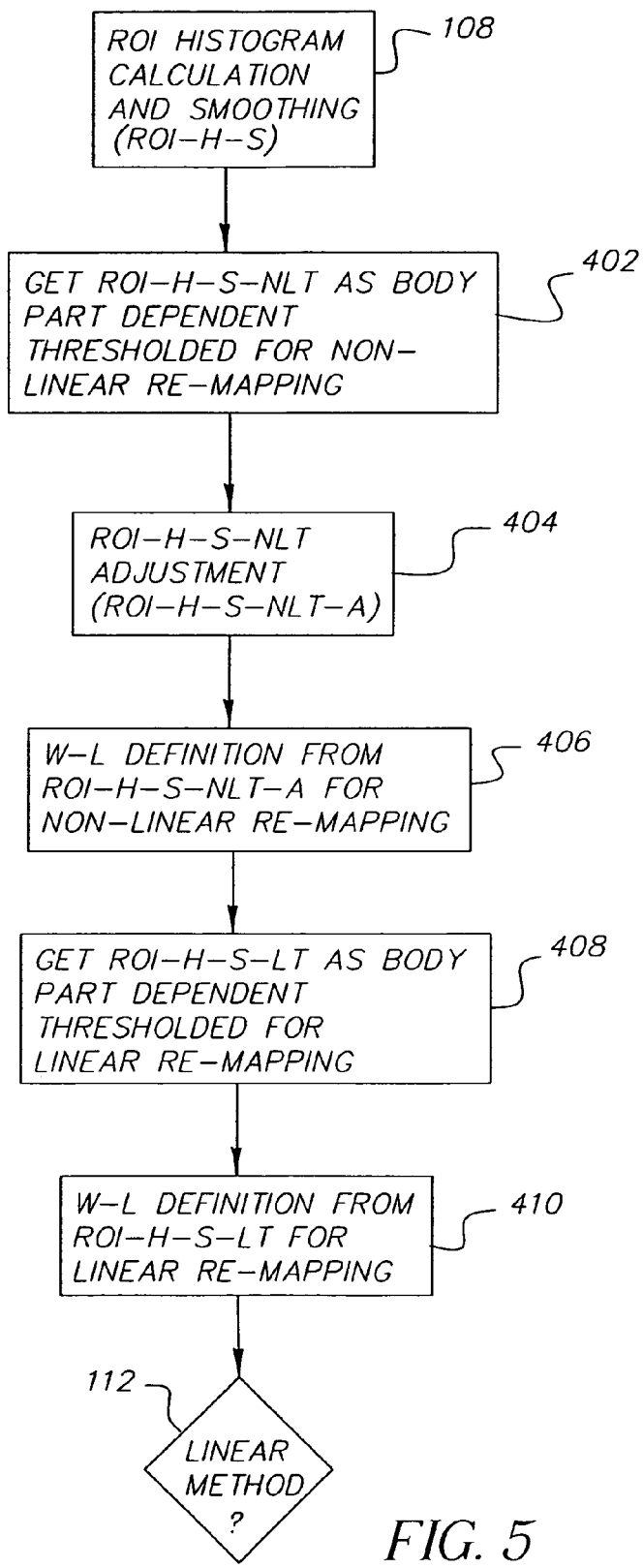
FIG. 5 shows a block diagram illustrating an algorithm for smoothed ROI-histogram analysis and window-level values calculation for linear and non-linear intensity re-mapping in accordance with the present invention.

The next step in the method of the present invention is ROI-histogram calculation and smoothing. Accordingly, block 108 is now discussed (block 108 is shown in FIGS. 1, 4, and 5). The histogram (ROI-H) is calculated from the input image within the extracted ROI and smoothed. The ROI-H histogram needs to be smoothed to avoid spikes that would affect further analysis. This smoothing might be done with well-known methods such as standard (see Gonzales, Woods, "Digital Image Processing", 2001) morphological or Gaussian or lowpass filtering. If the lowpass filtered ROI-H-S histograms (as will be shown below with reference to FIGS. 7b, 8b, 9b, 10b, and 11b) are compared with the original histograms (as will be shown below with reference to FIGS. 7a, 8a, 9a, 10a, and 11a), it is observed that the large values corresponding to image background and low intensities are dramatically changed. These values did not disappear completely though, because the extracted ROI might also contain some low intensity values.

The next step in the method of the present invention is defining W-L values for further steps of linear and non-linear intensity range re-mapping (block 110). Accordingly, referring now to FIG. 5, block 110 includes the steps disclosed by blocks 402–410.

As previously described, when radiologists/technicians adjust W-L, they are balancing the amount of black and white values with the number of the remaining pixel data, trying to display as many image details as possible within available gray scale. The ROI-H-S histograms are more informative than the original ones but they may still include very "low populated" (i.e., low informative) regions that may be removed to determine the most valuable intensity range.

Accordingly, to balance the amount of black and white pixels with the rest pixel data the present invention employs smoothed ROI-histogram thresholding, which is body part/view dependent, to define W-L values for further linear and non-linear re-mapping of original intensities. The intensity range differences for linear and non-linear re-mapping methods exist, because the non-linear method can display a broader intensity range than the linear method without a big decrease in the image contrast.

As described above, surface-coil images (usually used for spine imaging) tend to have a larger dynamic range than the body (surrounding) coil images.

For the non-linear re-mapping method, the present invention employs a median threshold for all body parts in the case of no information about the view presented in the image (block 402). However, if such information is available, then for spine axial data view the threshold is chosen to be the mean value of smoothed ROI-histogram, and for coronal view head images there is no threshold. After thresholding, the histogram may need some additional adjustment in some regions. There might be several histogram portions that exceed the threshold: primary (the widest one), secondary (more narrow), etc., which may be separated by gaps. If the intensity gap between the primary and any neighboring histogram segment is narrower than the width of the neighboring, then this segment is attached to the primary one. Such a histogram adjustment (block 404) prevents the loss of any valuable intensity range for non-linear intensity re-mapping.

For the linear re-mapping method, the present invention employs a mean value threshold for spine (or surface-coil) images and median value threshold for images of other body parts (block 408) to extract the most informative portion of the ROI-H-S histogram (as will be shown below with reference to FIGS. 7c, 8c, 9c, 10c, and 11c, dotted line).

The intensity range between the first and the last values of thresholded and adjusted ROI-H-S-NLT-A (block 406) and ROI-H-S-LT (block 410) histograms is considered as the window width and the middle point is considered as the window level. Those W-L values are defined for linear and non-linear re-mapping of the image intensity range. It might be useful to store the linear method values since a linear approach is standard practice and is widely used.

A last step for the present invention is a linear or non-linear re-mapping of the image intensity range. For both methods, the image pixels values (I) that are less/greater than a lower/upper limit of respective window are windowed ($I^w$), i.e., they are set to black/white respectively.

A linear method of image range re-mapping to display gray scale range is a standard and known linear transform of image pixel values within the defined window width (as will be shown with reference to FIGS. 7d, 8d, 9d, 10d, 11d, dotted line).

A non-linear re-mapping option can be used when there are several areas of interest with different intensity ranges within the defined ROI or when the image needs to be displayed with more contrast for detailed analysis (referring again to FIG. 1, block 116).

Figure 6:
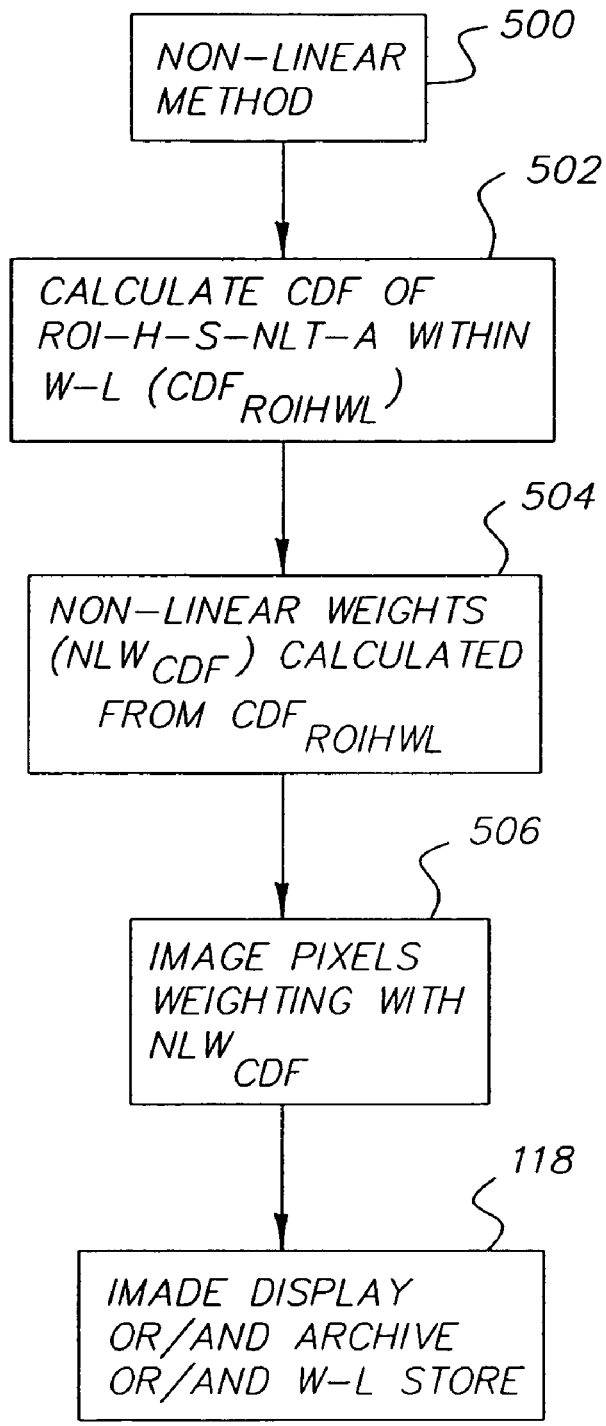
FIG. 6 shows a block diagram illustrating a non-linear option for intensity re-mapping in accordance with the present invention.

A proposed non-linear option for the present invention is an image intensity range re-mapping based on automated adjustment of light flux going through the ROI area, which might be reformulated in terms of a known histogram equalization technique (refer to Gonzales and Woods, Digital Image Processing, 2001). This technique is applied to ROI or, which is equivalent, to the histogram window defined in a previous step for the non-linear method. This non-linear method is implemented as illustrated in FIG. 6, and includes the steps shown in blocks 502–506.

At block 502, the cumulative distribution function (CDF) is calculated and normalized for the processed ROI-H-S-NLT-A histogram within the defined window. This CDF is then used as a non-linear transfer function for intensity re-mapping (as will be shown with reference to FIGS. 7d, 8d, 9d, 10d, and 11d, solid line). For this purpose weighting function coefficients $W_i$ are calculated (block 504) according to the relationship:

$$W_i = I + CDF_i \cdot (I_i - I_L)/\Delta I \qquad \text{(Equation 1)}$$

where i is an integer index within the interval equal to the defined window width, $CD_i$ is a normalized CDF value, $I_i$ is the image pixel value, $I_L$ is the lower limit of the defined window, and $\Delta l$ is the defined window width.

Next, all windowed image pixels $I^w$ are weighted using the function W(I) to get final image pixel values I' (block 506) for display:

$$I' = W(I) \cdot I^w \qquad \text{(Equation 2)}$$

$$I_i^w = \begin{cases} I_L & i \leq L = \text{window lower limit} \\ I_i, & L < i < U \\ I_U, & i \geq U = \text{window upper limit} \end{cases}$$

where $I^W$ is windowed image, i.e.

Finally, the linearly or non-linearly intensity re-mapped image is displayed at the workstation for diagnosis, stored, or archived with the W-L values calculated for linear intensity re-mapping method to be included with the image in the archive (block 118). Usually, images presented with linear re-mapped intensities appears to be a bit brighter in general than non-linear W-Led one. This provides flexibility to the proposed method so that a user's personal preferences can be used to select the desired presentation.

FIGS. 7–11 more particularly illustrate the method of the present invention.

Figure 7C:
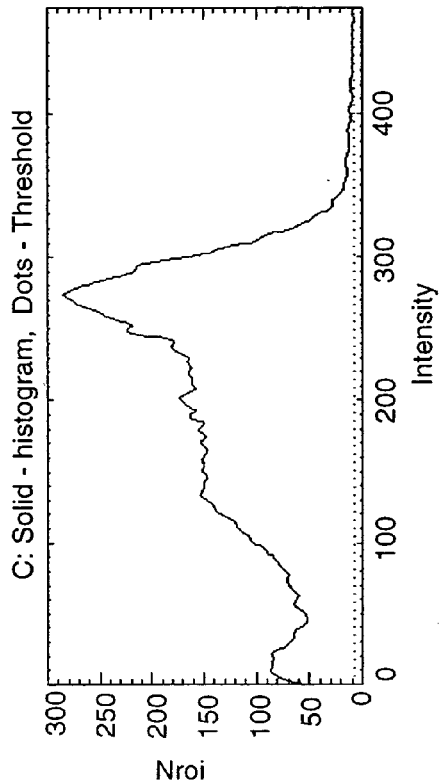
FIGS. 7a–7d illustrate histograms and re-mapping functions calculated for a sagittal head image in FIG. 7a the original image histogram.
Figure 7D:
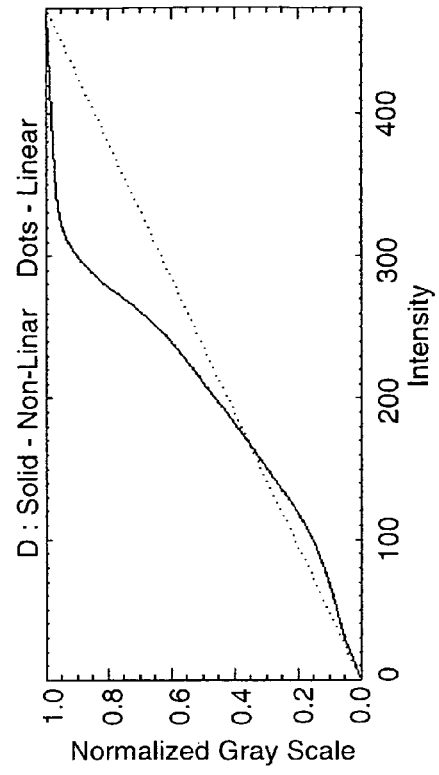
Figure 7A:
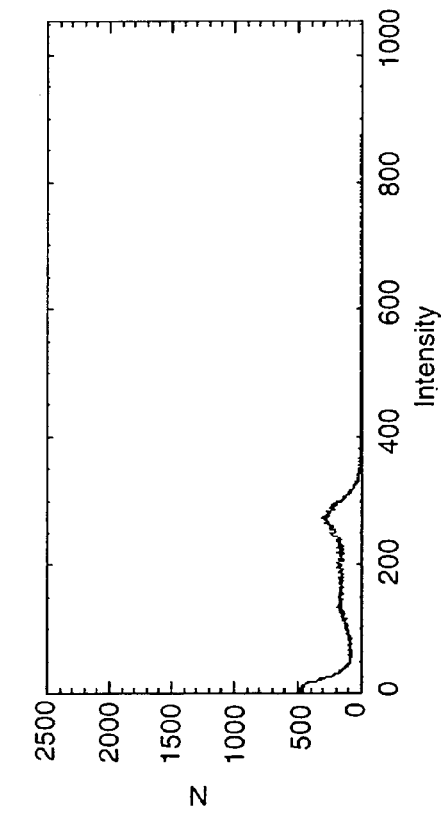
Figure 7B:
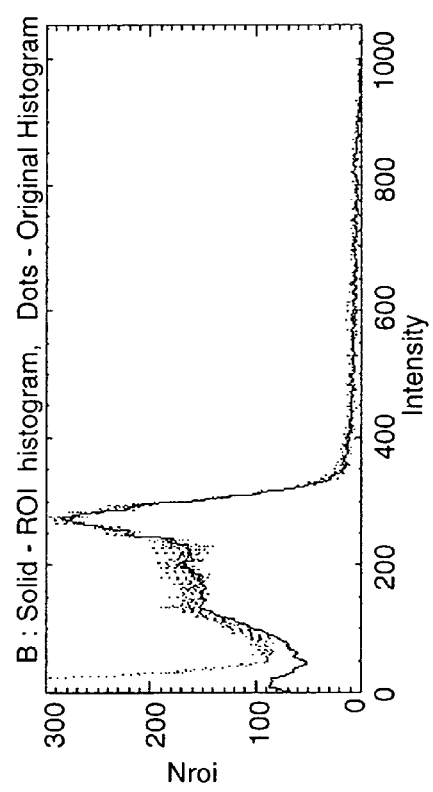

FIGS. 7a–7d illustrate histograms and re-mapping functions calculated for a sagittal head image. FIG. 7a shows the original image histogram. FIG. 7b shows the smoothed ROI-histogram (the original histogram is shown in dotted line). FIG. 7c shows the smoothed ROI-histogram thresholded for non-linear intensity re-mapping method (threshold for linear method is shown in dotted line). FIG. 7d shows the re-mapping transfer functions.

Figure 8A:
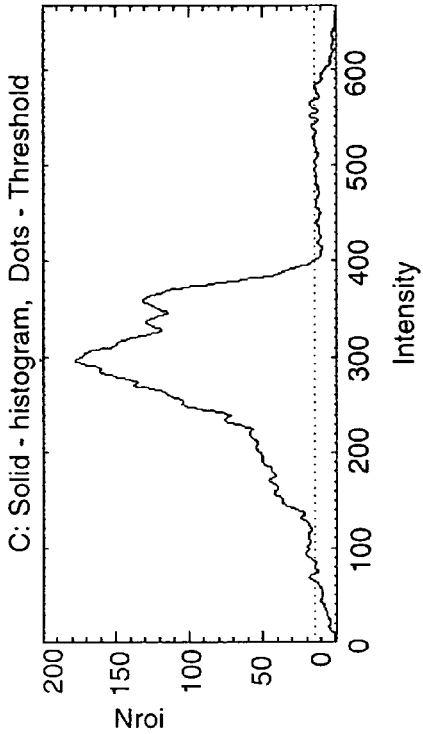
FIGS. 8a–8d illustrate histograms and re-mapping functions calculated for a coronal head image within in FIG. 8a the original image histogram.
Figure 8C:
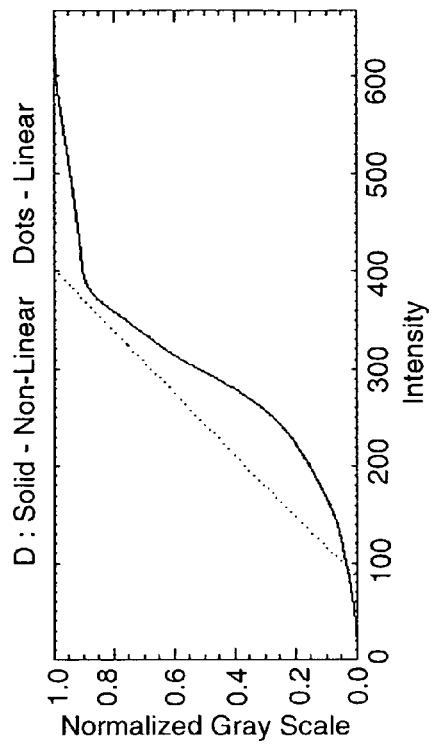
Figure 8B:
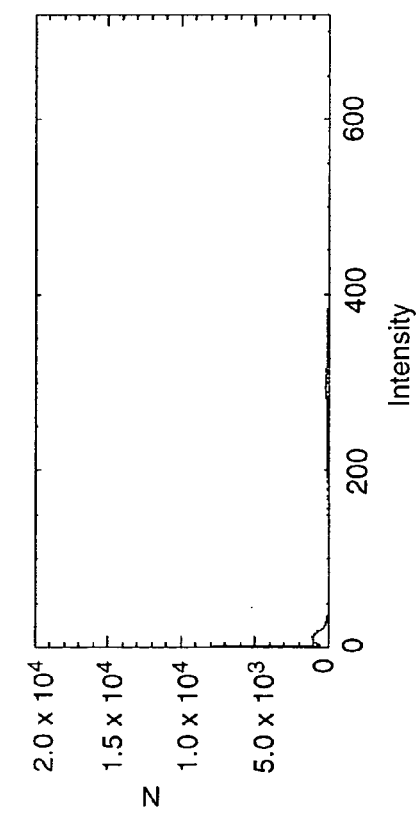
Figure 8D:
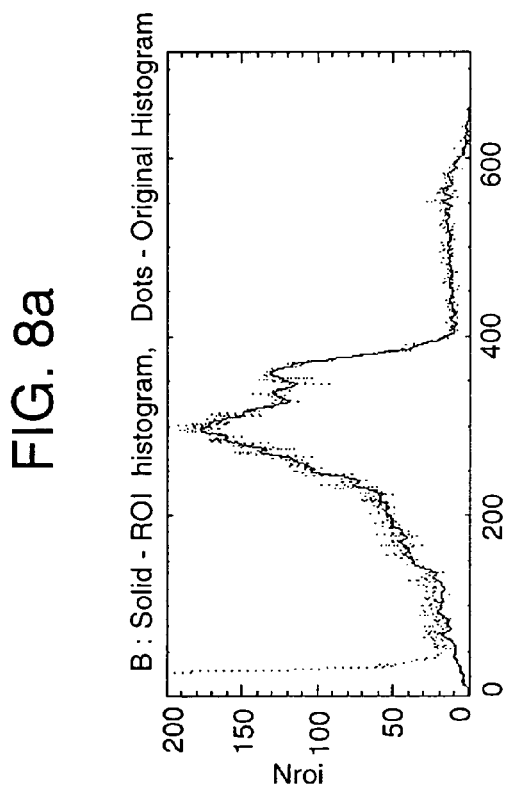

FIGS. 8a–8d illustrate histograms and re-mapping functions calculated for a coronal head image. FIG. 8a shows the original image histogram. FIG. 8b shows the smoothed ROI-histogram (original histogram is shown in dotted line). FIG. 8c shows the smoothed ROI-histogram thresholded for non-linear intensity re-mapping method (threshold for linear method is shown in dotted line). FIG. 8d shows the re-mapping transfer functions.

Figure 9A:
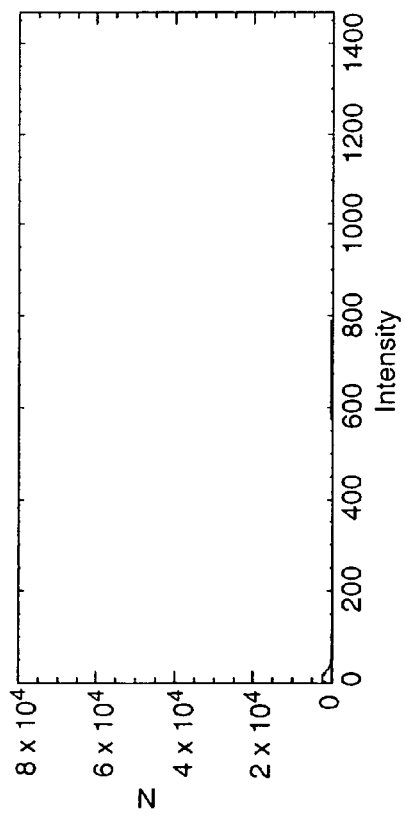
FIGS. 9a–9d illustrate histograms and re-mapping functions calculated for an axial head image within in FIG. 9a the original image histogram.
Figure 9C:
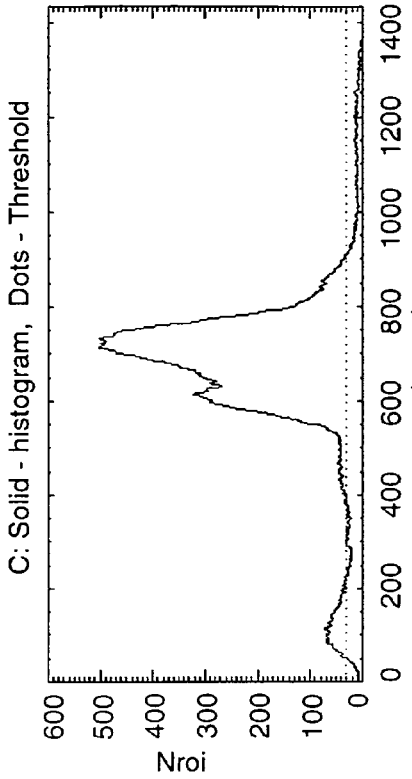
Figure 9B:
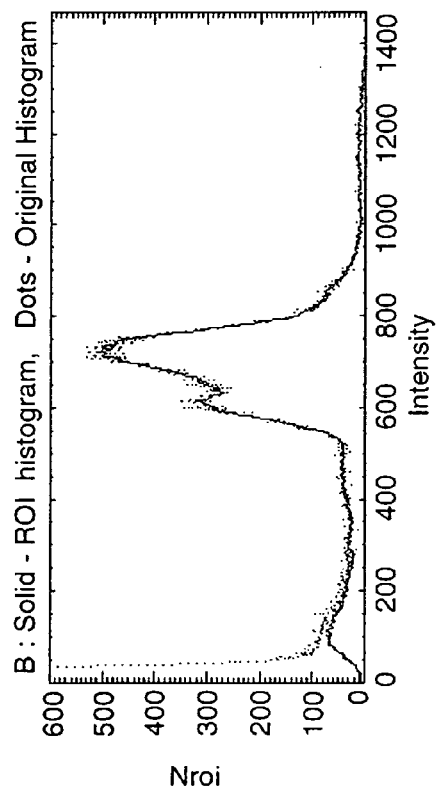
Figure 9D:
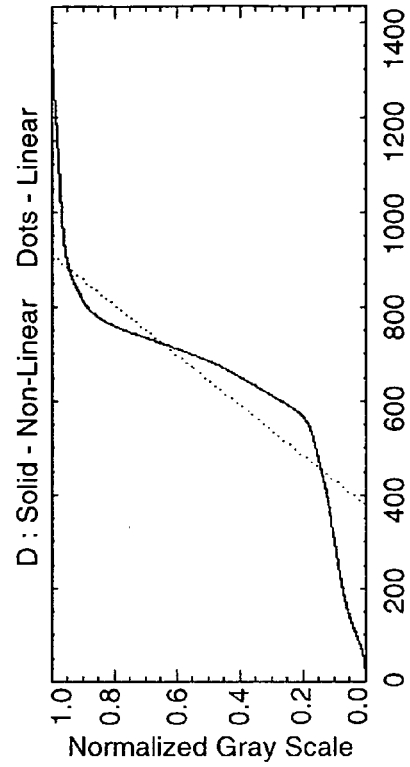

FIGS. 9a–9d illustrate histograms and re-mapping functions calculated for an axial head image. FIG. 9a shows the original image histogram. FIG. 9b shows the smoothed ROI-histogram (original histogram is shown in dotted line). FIG. 9c shows the smoothed ROI-histogram thresholded for non-linear intensity re-mapping method (threshold for linear method is shown in dotted line). FIG. 9d shows the re-mapping transfer functions.

Figure 10A:
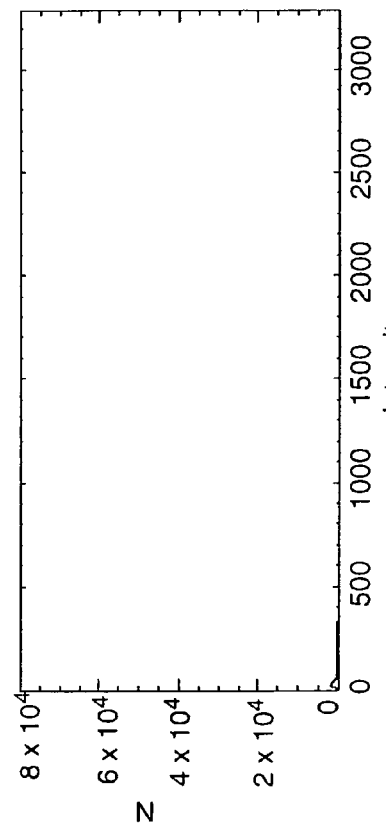
FIGS. 10a–10d illustrate histograms and re-mapping functions calculated for sagittal spine image within in FIG. 10a the original image histogram.
Figure 10C:
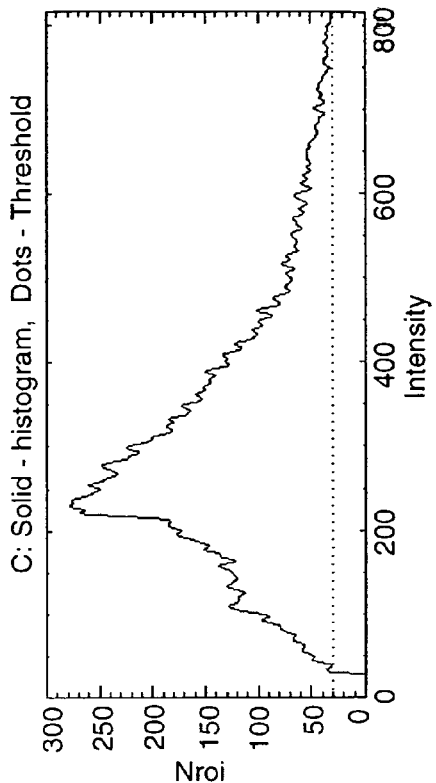
Figure 10B:
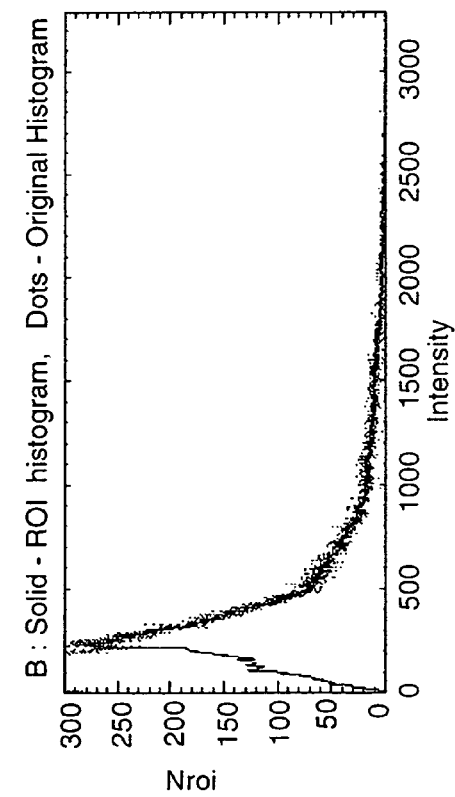
Figure 10D:
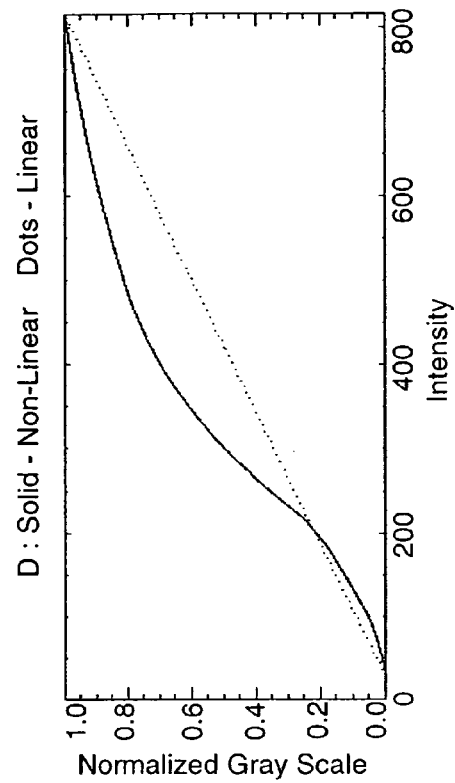

FIGS. 10a–10d illustrate histograms and re-mapping functions calculated for a sagittal spine image. FIG. 10a shows the original image histogram. FIG. 10b shows the smoothed ROI-histogram (original histogram is shown in dotted line). FIG. 10c shows the smoothed ROI-histogram thresholded for non-linear intensity re-mapping method (threshold for linear method is shown in dotted line). FIG. 10d shows the re-mapping transfer functions.

Figure 11C:
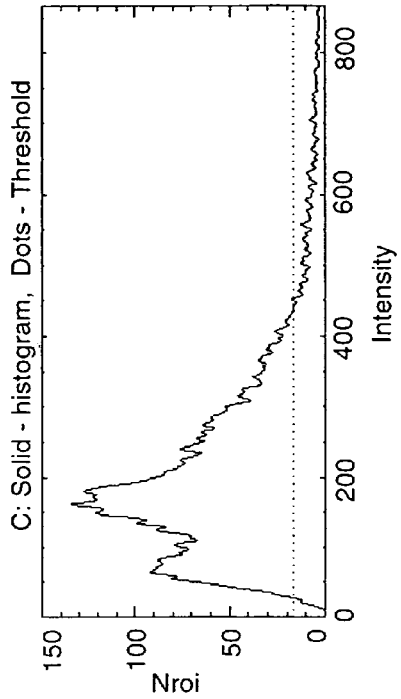
FIGS. 11a–11d illustrate histograms and re-mapping functions calculated for axial spine image within in FIG. 11a the original image histogram.
Figure 11D:
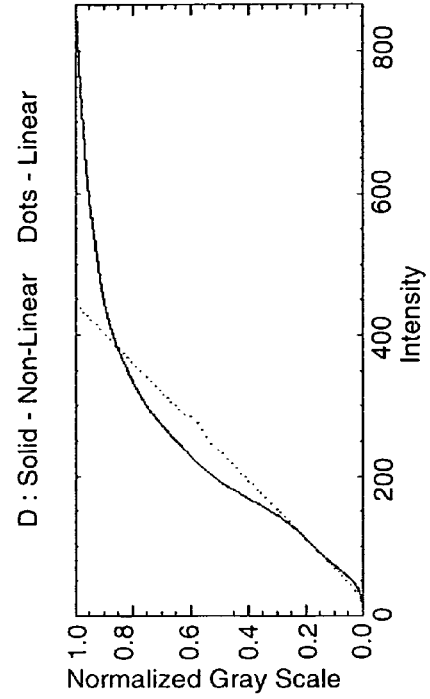
Figure 11A:
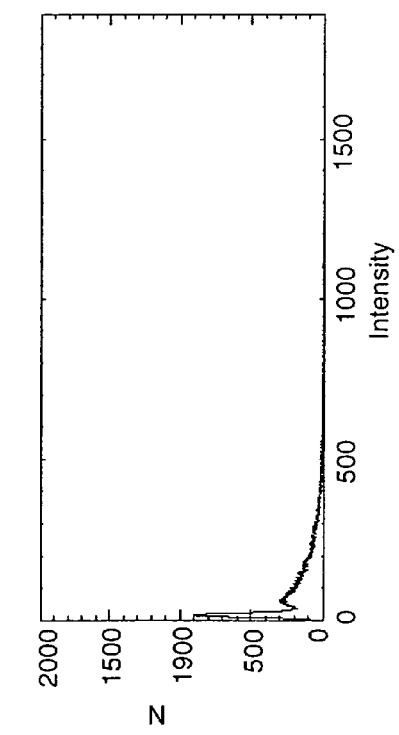
Figure 11B:
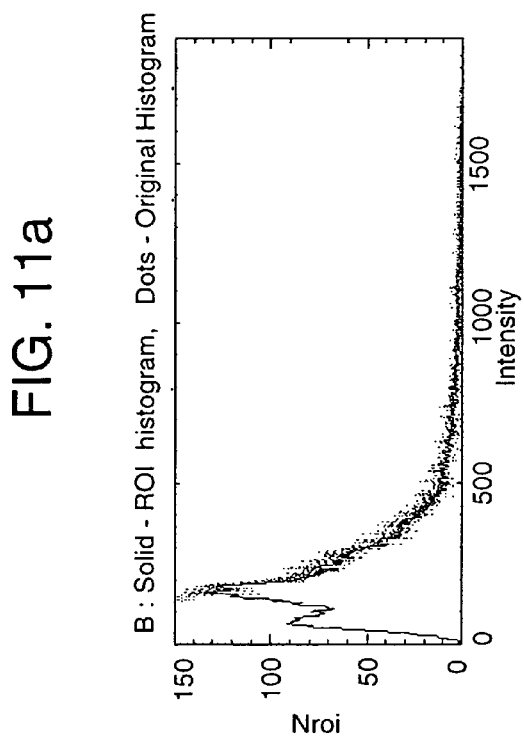

FIGS. 11a–11d illustrate histograms and re-mapping functions calculated for an axial spine image. FIG. 11a shows the original image histogram. FIG. 11b shows the smoothed ROI-histogram (original histogram is shown in dotted line). FIG. 11c shows the smoothed ROI-histogram thresholded for non-linear intensity re-mapping method (threshold for linear method is shown in dotted line). FIG. 11d shows the re-mapping transfer functions.

FIGS. 12a–12b illustrate an output MR sagittal head image with non-linear re-mapped intensities (FIG. 12a) and corresponding ROI binary mask (FIGS. 12b).

FIGS. 13a–13b illustrate an output MR coronal head image with non-linear re-mapped intensities (FIG. 13a) and corresponding ROI binary mask (FIG. 13b).

Figures 14A, 14B:
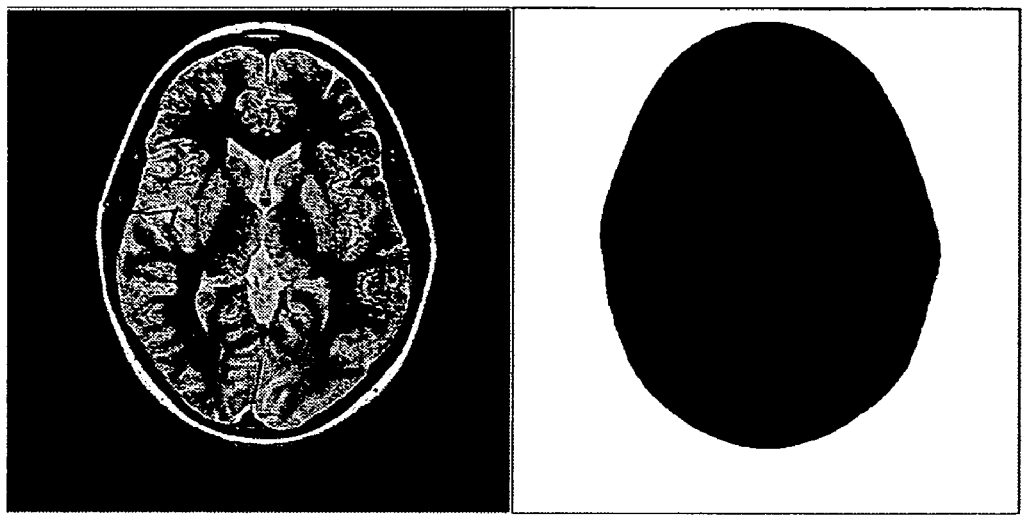
FIGS. 14a–14b illustrate an output MR axial head image with non-linear re-mapped intensities (FIG. 14a) and corresponding ROI binary mask (FIG. 14b).

FIGS. 14a–14b illustrate an output MR axial head image with non-linear re-mapped intensities (FIG. 14a) and corresponding ROI binary mask (FIG. 14b).

FIGS. 15a–15b illustrate an output MR sagittal spine image with non-linear re-mapped intensities (FIG. 15a) and corresponding ROI binary mask (FIG. 15b).

FIGS. 16a–16b illustrate an output MR axial spine image with non-linear re-mapped intensities (FIG. 16a) and corresponding ROI binary mask (FIG. 16b).

The method of the present invention has been implemented, and as implemented, performance in the range of about 0.05 sec (on a Pentium III/500 MHz PC) has been accomplished to process each MRI slice of size 512×512 pixels.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method of automatically determining window-level settings in a digital image of a subject, comprising:
   accessing the digital image;
   obtaining body part or coil type information;
   determining a region of interest (ROI) within the digital image;
   producing and processing a ROI-histogram;
   defining a W-L value for a linear or non-linear image intensity range re-mapping; and
   linear or non-linear re-mapping the image intensity range, wherein the step of obtaining coil type information comprises image symmetry analysis.

2. The method of claim 1, wherein the image symmetry analysis comprises the steps of:
   calculating a vector of row mean values;
   determining a maximal deviation of the row vector from an image global mean value;
   calculating a vector of column mean values;
   determining a maximal deviation of the column vector from the image global mean value; and
   employing a predetermined value image asymmetry factor.

3. The method of claim 2, wherein the predetermined value image asymmetry factor has a value of about 2.

4. The method of claim 1, wherein the step of determining a region of interest (ROI) comprises image segmentation in a spatial domain.

5. The method of claim 4, wherein the image segmentation comprises the steps of:
   determining pixels of interest (POI) employing an image global mean value (GMV) as a threshold;
   grouping the POI by defining an external boundary (EB); and
   morphologically filtering the region within the EB to define the ROI.

6. The method of claim 1, wherein the step of producing and processing a ROI-histogram comprises the steps of:
   calculating a histogram within the ROI; and
   smoothing the ROI-histogram with a lowpass, morphological or Gaussian filter.

7. The method of claim 1, wherein the step of defining a W-L value comprises the step of thresholding and adjusting the ROI-histogram.

8. The method of claim 1, wherein the step of non-linear re-mapping comprises the steps of:
   calculating a non-linear intensity transfer function;

calculating non-linear weighting function coefficients; and non-linear transforming of input image pixels.

9. The method of claim 8, wherein the step of calculating a non-linear intensity transfer function is based on a cumulative distribution function (CDF) calculation from a smoothed, thresholded and adjusted ROI-histogram within a defined window for non-linear image intensity range re-mapping.

10. The method of claim 1, wherein the digital image is a magnetic resonance image acquired using a magnetic resonance imaging (MRI) system.

11. The method of claim 1, further comprising the step of displaying, archiving, or storing the digital image.

12. The method of claim 1, further comprising the step of displaying, archiving, or storing the W-L value.

13. A method of automatically determining window-level settings in a digital image of a subject, comprising:
  accessing the digital image;
  obtaining body part or coil type information;
  determining a region of interest (ROI) within the digital image;
  producing and processing a ROI-histogram;
  defining a W-L value for a linear or non-linear image intensity range re-mapping; and
  linear or non-linear re-mapping the image intensity range,
  wherein the step of defining a W-L value comprises the step of thresholding and adjusting the ROI-histogram, and
  wherein the step of thresholding is accomplished by employing a threshold having a value different for the linear image intensity range re-mapping than for the non-linear image intensity range re-mapping.

14. The method of claim 13, wherein the step of adjusting is accomplished by the steps of attaching valuable portions of the thresholded ROI-histogram for the non-linear image intensity range re-mapping to its widest portion when the valuable portions are separated from the widest one by gaps in intensity.

15. The method of claim 13, wherein the step of defining a W-L value for a non-linear image intensity range re-mapping comprises the steps of:
  smoothing, thresholding, and adjusting the ROI-histogram;
  defining a window width as the difference between a last and a first non-zero value of the smoothed, thresholded and adjusted ROI-histogram; and
  defining a window level as a middle point between the last and first non-zero values of the smoothed, thresholded and adjusted ROI-histogram.

16. The method of claim 13, wherein the step of non-linear re-mapping the image intensity range comprises the step of windowing the input image pixels by setting all input image pixel values to black/white for image pixels that are less/greater than a predetermined lower/upper window limit, respectively.

17. A method of automatically determining window-level settings in a digital image of a subject, comprising:
  accessing the digital image;
  obtaining body part or coil type information;
  determining a region of interest (ROI) within the digital image;
  producing and Processing a ROI-histogram;
  defining a W-L value for a linear or non-linear image intensity range re-mapping; and
  linear or non-linear re-mapping the image intensity range,
  wherein the step of non-linear re-mapping comprises the steps of:
    calculating a non-linear intensity transfer function;
    calculating non-linear weighting function coefficients; and
    non-linear transforming of input image pixels, and
  wherein the non-linear weighting function coefficients $W_i$ are calculated by the relationship:

$$W_i = 1 + CDF_i \cdot (I_i - I_L)/\Delta I$$

where i is an integer, $CDF_i$, is a normalized CDF value, $I_i$ is an image pixel value, $I_L$ is a window lower limit, and $\Delta I$ is a defined window width.

18. A method of automatically determining window-level settings in a digital image of a subject, comprising:
  accessing the digital image;
  obtaining body part or coil type information;
  determining a region of interest (ROI) within the digital image;
  producing and processing a ROI-histogram;
  defining a W-L value for a linear or non-linear image intensity range re-mapping; and
  linear or non-linear re-mapping the image intensity range,
  wherein the step of non-linear re-mapping comprises the steps of:
    calculating a non-linear intensity transfer function;
    calculating non-linear weighting function coefficients; and
    non-linear transforming of input image pixels, and
  wherein the step of non-linear transforming is accomplished according to the relationship:

$$I' = W(I) \cdot I^w$$

where I' are transformed image pixel values, W(I) is a weighting function, $I^w$ are windowed input image pixel values.

* * * * *